(12) United States Patent
Jeon

(10) Patent No.: US 9,724,982 B2
(45) Date of Patent: Aug. 8, 2017

(54) AIR VENT FOR VEHICLE

(71) Applicant: HYUNDAI MOBIS CO., LTD., Seoul (KR)

(72) Inventor: Duk Chul Jeon, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/621,185

(22) Filed: Feb. 12, 2015

(65) Prior Publication Data

US 2015/0375601 A1 Dec. 31, 2015

(30) Foreign Application Priority Data

Jun. 30, 2014 (KR) ........................ 10-2014-0080727

(51) Int. Cl.
*B60H 1/34* (2006.01)
(52) U.S. Cl.
CPC ..... *B60H 1/3421* (2013.01); *B60H 2001/3471* (2013.01)
(58) Field of Classification Search
CPC .......... B60H 2001/3471; B60H 1/3421; B60H 1/3414
USPC ....................................................... 454/155
See application file for complete search history.

(56) References Cited

U.S. PATENT DOCUMENTS

| 7,198,062 | B2 * | 4/2007 | Hoffman | B60H 1/248 137/601.09 |
| 2005/0245189 | A1 * | 11/2005 | Terai | B60H 1/3414 454/155 |
| 2006/0172680 | A1 * | 8/2006 | Gehring | B60H 1/3428 454/152 |
| 2014/0120823 | A1 * | 5/2014 | Brinas | B60H 1/34 454/155 |
| 2015/0004897 | A1 * | 1/2015 | Ishikawa | B60H 1/3421 454/155 |

FOREIGN PATENT DOCUMENTS

JP 04136657 A * 5/1992
KR 10-2009-0130598 A 12/2009

OTHER PUBLICATIONS

English translation of Abstract of JP04136657A.*

* cited by examiner

*Primary Examiner* — Helena Kosanovic

(57) ABSTRACT

The present invention provides an air vent for a vehicle, in which an unevenness shape is formed at one end portion of each of front wings that are closed to overlap each other, thereby preventing the occurrence of a whistling noise and minimizing the occurrence of an air leak.

12 Claims, 3 Drawing Sheets

[FIG. 1]
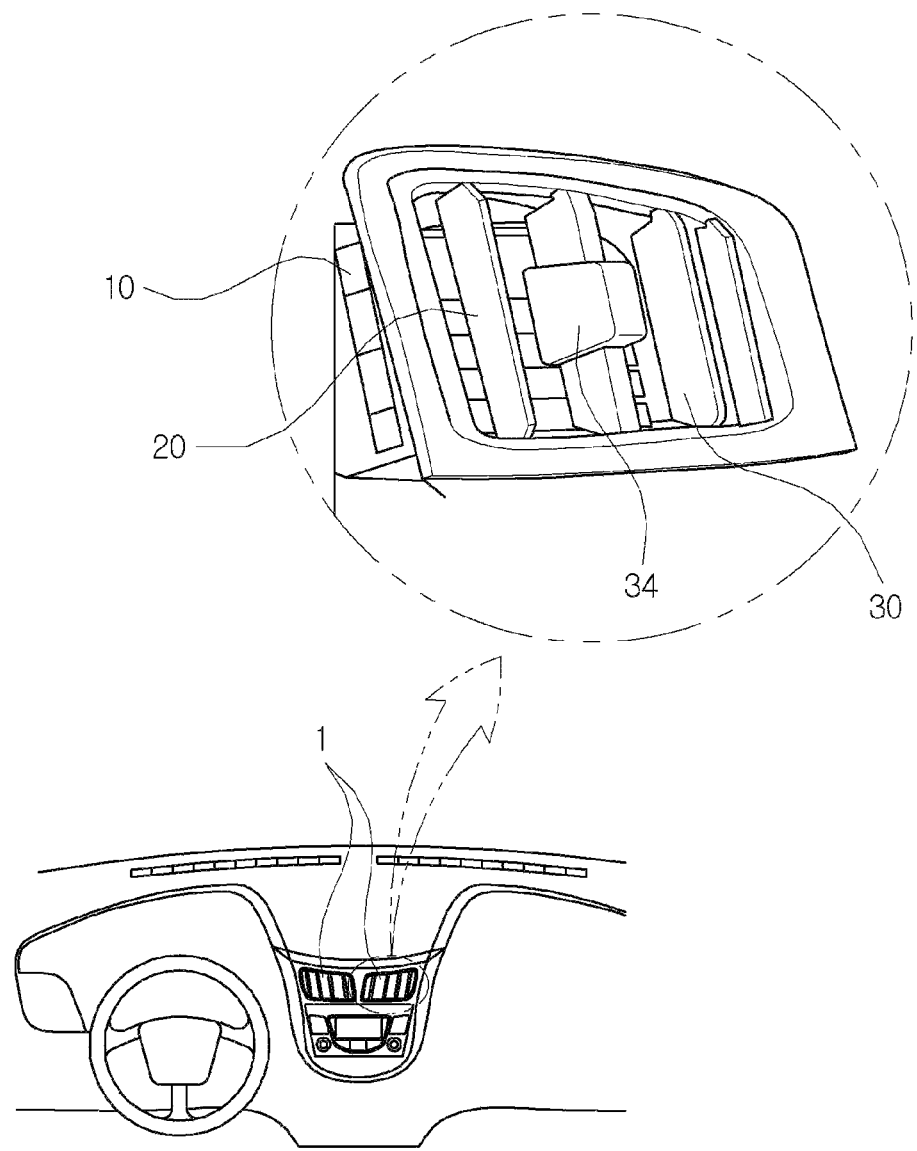

[FIG. 2]
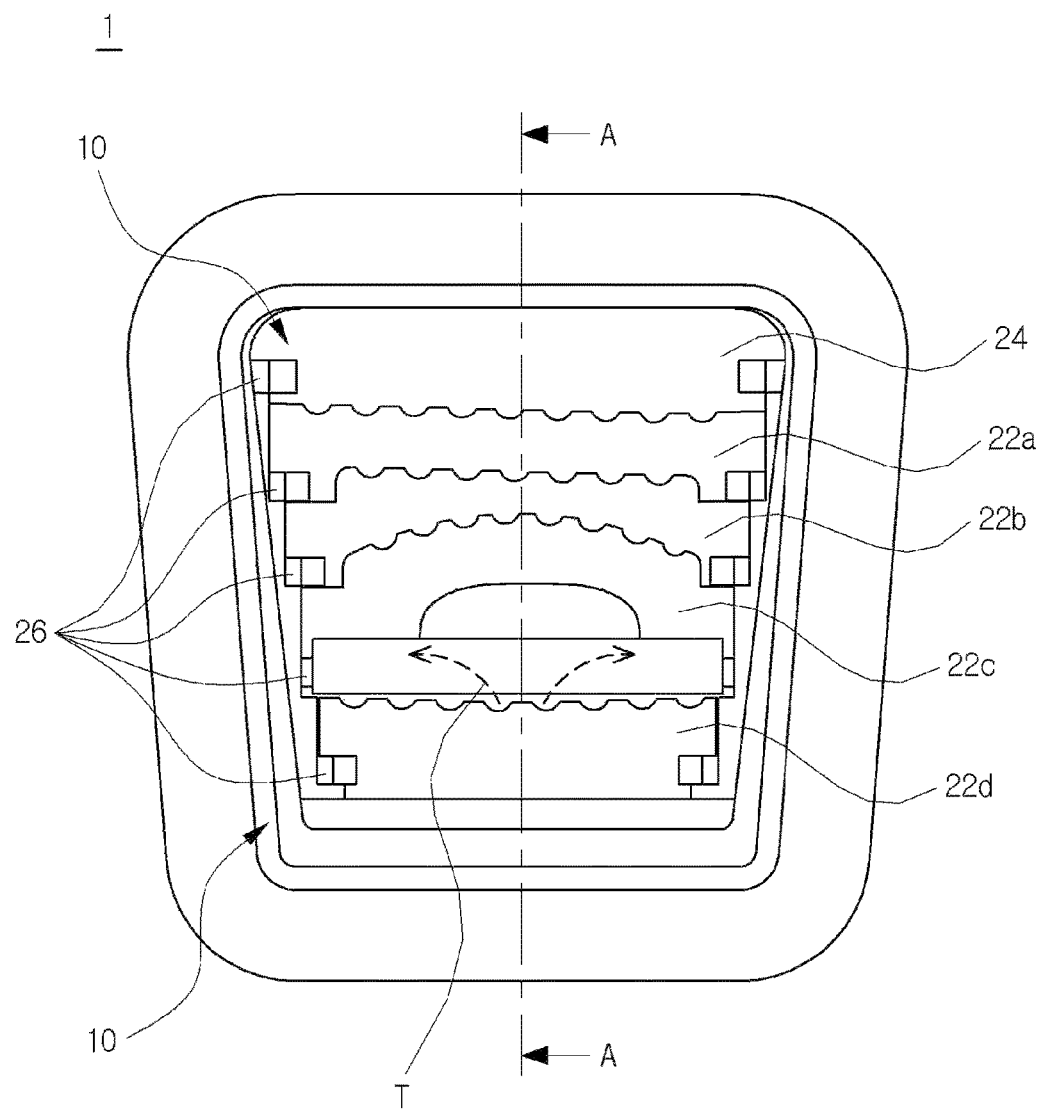

[FIG. 3]
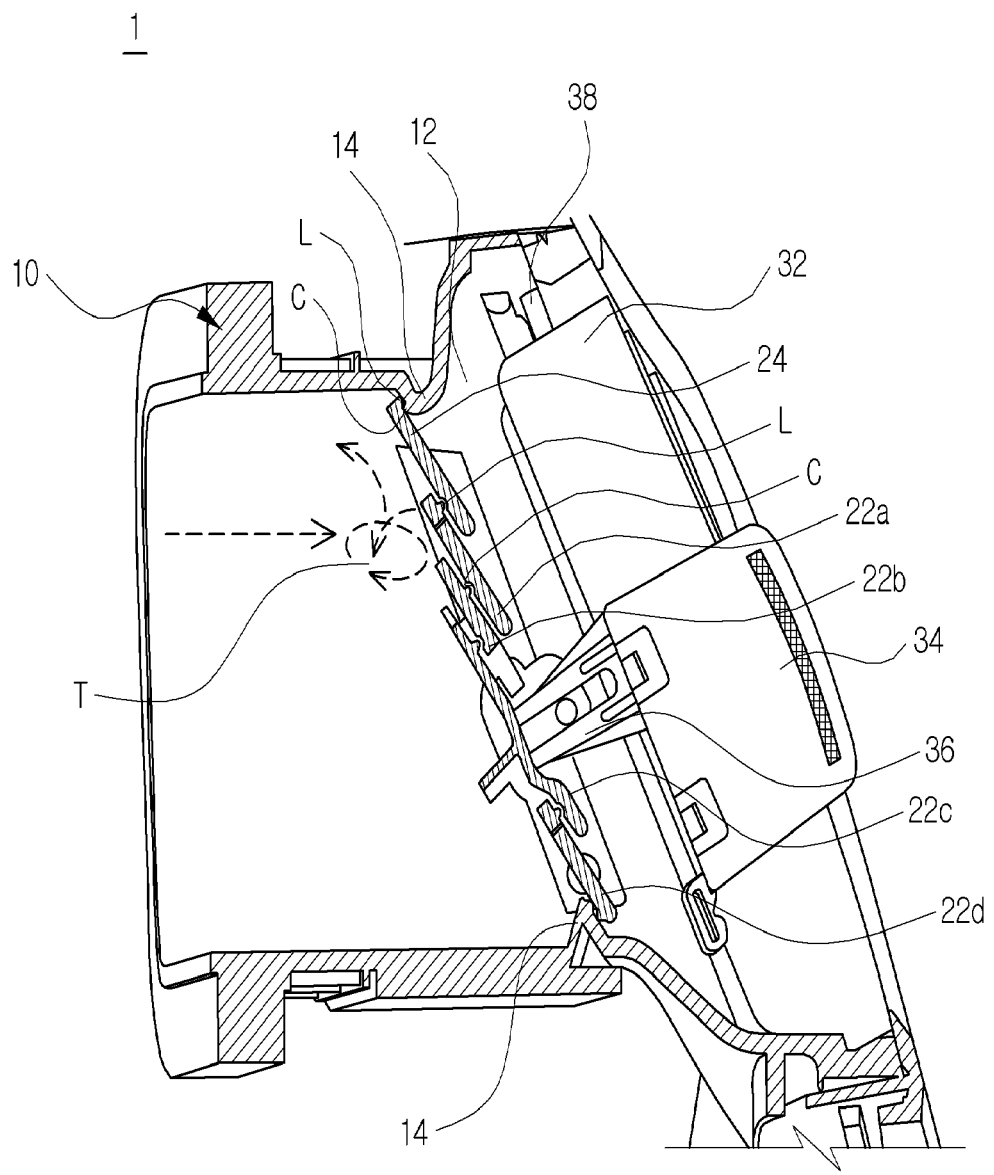

AIR VENT FOR VEHICLE

CROSS-REFERENCE TO RELATED APPLICATIONS

This application claims priority to and the benefit of Korean Patent Application No. 10-2014-0080727 filed in the Korean Intellectual Property Office on Jun. 30, 2014, the entire contents of which are incorporated herein by reference.

TECHNICAL FIELD

The present invention relates to an air vent for a vehicle, in which an unevenness shape is formed at one end portion of each of the front wings that are closed to overlap each other, thereby preventing the occurrence of a whistling noise and minimizing the occurrence of an air leak.

BACKGROUND ART

In general, an air conditioning system (HVAC: heating, ventilating, and air conditioning) for a vehicle means an air adjusting device that may maintain temperature, humidity, and cleanliness of air in the interior of the vehicle.

The HVAC may circulate cold air into the interior of the vehicle using processes of compressing, condensing, expanding, and evaporating a refrigerant in the vehicle, and may circulate warm air into the interior of the vehicle using a coolant heated by an engine.

The HVAC has an air vent that discharges air to the interior of the vehicle, and the air vent is installed in an instrument panel adjacent to a driver seat.

In the air vent for a vehicle in the related art, a damper, which is manually or automatically operated, is installed in a duct, which is an air flow path, in order to adjust a direction, a velocity, and an amount of air that is discharged in accordance with an operation of a heater or an air conditioner. Further, wings, which are operated in conjunction with the damper to adjust an air direction, are also installed.

The damper and the wings are installed in the duct, which is an air flow path, in a horizontal direction or a vertical direction, respectively, and vice versa, and the wings adjust a direction of air discharged through the duct, and shut off the discharge of air by closing an exit of the duct. In this case, when the wings are closed, the damper linked to the wings shuts off a passage inside the duct, thereby shutting off air discharged to the exit of the duct.

Recently, in order to reduce production costs for the air vent and simplify a structure of the air vent, a wing-close-type air vent, which does not use the damper and shuts off discharge of air only by using the wings, is used.

The wing-close-type air vent has front wings and rear wings that are installed in the discharge port of the duct in the horizontal and vertical directions or in the vertical and horizontal directions, and discharge of air is shut off as wings provided in the front wings and the rear wings overlap each other. Further, a direction, a velocity, and an amount of air discharged through the air vent are adjusted by controlling the front wings and the rear wings.

The wing-close-type air vent has predetermined gaps between the respective wings, which constitute the front wings and the rear wings, in order to prevent the wings from colliding with each other while the wings overlap each other. While the front wings and the rear wings are closed, air passing over the front wings and the rear wings generates a whistling noise similar to sound of a whistle caused by air resistance at the gaps between the wings. In addition, in a case in which there is no gap between the wings, a level of the whistling noise is further increased, and in a case in which the gap between the wings is greater than a predetermined gap, a large amount of air leaks occurs because discharge of air cannot be appropriately shut off

LITERATURE OF RELATED ART

Korean Patent Application Laid-Open No. 10-2009-0130598 (Filing Date: Jun. 16, 2008)

SUMMARY OF THE INVENTION

The present invention has been made in an effort to provide an air vent for a vehicle, which is capable of effectively preventing a whistling noise from occurring due to air resistance while air collides with the front wings when air discharged from the air vent for a vehicle is shut off by closing the front wings and rear wings of the air vent, and capable of reducing production costs because a damper does not need to be installed.

An exemplary embodiment of the present invention provides an air vent for a vehicle, including: a duct which has a discharge port; front wings which are positioned upstream of the discharge port and have a plurality of unevenness wings having one end portion formed in an unevenness shape; rear wings which are positioned downstream of the discharge port, control air passing over the front wings and have a plurality of wings that are disposed to be perpendicular to the front wings; and a wing opening and closing device which controls operations of opening and closing the front wings and the rear wings.

The front wings and the rear wings may have an overlapping structure in which predetermined portions of the wings overlap each other when the front wings and the rear wings are closed using the wing opening and closing device, and predetermined gaps may be formed between the plurality of unevenness wings and between the plurality of wings.

One end portion of the unevenness wing of the front wings, which is directed in a direction in which air flows in, may be formed in an unevenness shape.

The unevenness shape of the unevenness wing of the front wings may be directed toward an upper side or a lower side when the front wings are closed.

The front wing may further include an uppermost wing which is positioned over the plurality of unevenness wings and formed in a flat shape.

A protrusion, which protrudes in a direction toward the rear wings, may be provided on an upper surface of each of the front wings, which overlaps another front wing when the front wings are closed, and a groove, into which the protrusion is inserted, may be formed in one surface of each of the wings which comes into contact with the protrusion.

The unevenness wing may include a semi-circular notch.

The unevenness wing may include a polygonal notch.

The unevenness wing may include an irregular-shaped notch.

The predetermined gaps between the plurality of unevenness wings and between the plurality of wings may be 0.5 mm or less.

The wing opening and closing device may include a knob connecting portion which is connected to the rear wings and the front wings, and a knob which is connected to the knob connecting portion and installed onto the rear wings.

The wing opening and closing device may include a handle connecting portion which is connected to the rear wings and the front wings, and a handle which is connected to the handle connecting portion and installed outside the discharge port.

The wing opening and closing device may include a connecting portion which is connected to the rear wings and the front wings and has an electric motor; and a button which is installed on an instrument panel in a vehicle to control an operation of the electric motor.

The duct may include projections that overlap an uppermost wing and a lowermost wing of the front wings when the front wings are closed.

According to the air vent for a vehicle according to the exemplary embodiment of the present invention, the unevenness shape is formed at one end portion of each of the front wings installed in the discharge port of the duct, thereby effectively preventing a whistling noise from occurring due to air resistance when the front wings are closed or after the front wings are closed.

Because a damper need not be installed in the duct of the air vent, thereby reducing costs and time required to manufacture the air vent, and simplifying the structure of the air vent.

The effects of the present invention are not limited to the aforementioned effects, and other effects, which are not mentioned above, will be clearly understood by those skilled in the art from the claims.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a perspective view of an air vent for a vehicle according to an exemplary embodiment of the present invention.

FIG. 2 is a rear view of FIG. 1.

FIG. 3 is a cross-sectional view taken along line A-A' of FIG. 2.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings. First, in denoting reference numerals to constituent elements of respective drawings, it should be noted that the same constituent elements will be designated by the same reference numerals even though they are shown in different drawings. In addition, in the description of the present invention, the detailed descriptions of known related constitutions or functions thereof may be omitted if they make the gist of the present invention unclear. Further, hereinafter, an exemplary embodiment of the present invention will be described, but it is obvious that the technical spirit of the present invention is not restricted or limited thereto, but the exemplary embodiment of the present invention may be modified by a person with ordinary skill in the art to be variously carried out.

Referring to FIGS. 1 to 3, an air vent 1 for a vehicle according to an exemplary embodiment of the present invention may include a duct 10 which has a discharge port 12, front wings 20 which are positioned upstream of the discharge port 12 and have a plurality of unevenness wings 22 that has one end portion formed in an unevenness shape, rear wings 30 which are positioned downstream of the discharge port 12, control air passing over the front wings 20 and have a plurality of wings 32 that is disposed to be perpendicular to the front wings 20, and a wing opening and closing device which controls operations of opening and closing the front wings 20 and the rear wings 30.

In the exemplary embodiment of the present invention, for helping to understand the present invention, a direction in which air flows from the duct 10 is referred to as an upstream direction of the discharge port, and a direction in which air is discharged and flows to the outside is referred to as a downstream direction.

The one end portion of the unevenness wing 22 of the front wings 20, which is directed in the direction in which air flows in, may be formed in an unevenness shape. Regarding a direction of the unevenness shape formed on the unevenness wing 20, the unevenness shape may be directed toward the upper side or the lower side when the unevenness wing 20 is closed. Air, which is initially blown from the duct 10, flows in a laminar flow, but the laminar flow is converted into a turbulent flow T when the air collides with the unevenness shape of the unevenness wing 22. Air, which flows in the turbulent flow T, facilitates mixture of air, and reduces resistance of air that occurs against the front wings 20, thereby preventing a whistling noise. The turbulent flow T does not have a certain form, but for helping to understand the exemplary embodiment of the present invention, the turbulent flow T is schematically illustrated in the drawings.

The front wings 20 have an overlapping structure in which predetermined portions of the plurality of unevenness wings 22 overlap each other when the front wings 20 are closed using the wing opening and closing device, and predetermined gaps may be formed between the plurality of unevenness wings 22. When there is no predetermined gap between the plurality of unevenness wings 22, the whistling noise is increased, and when the predetermined gap is increased, the occurrence of an air leak may be increased.

The predetermined gap between the plurality of unevenness wings 22 may be 0.5 mm or less. For example, when the predetermined gap between the respective wings of the front wings 20 is maintained to 0.5 mm or less, an amount of air leaks may be decreased to 20 CMH ($m^3/h$) or less. Because an amount of air leaks is minimized as described above, it is not necessary to install a damper inside the duct 10. Therefore, the number of components, which constitute the air vent 1, may be reduced, thereby reducing production costs for products, and improving productivity of products.

The front wings 20 may further include an uppermost wing 24 which is positioned over the plurality of unevenness wings 22 and formed in a flat shape. Because of viscosity resistance between air and an inner surface of the duct 10, an amount of air discharged to an uppermost side inside the duct 10 is smaller than an amount of air discharged from geometric central portion of the duct 10, such that a level of a whistling noise, which occurs when air collides with the uppermost wing 24, is lower than a level of a whistling noise, which occurs when air collides with the unevenness wing 22, and the uppermost wing 24 is tightly and closely attached to an inner portion of the duct 10 when air flowing from the duct 10 is shut off, thereby reducing the occurrence of an air leak.

For example, the plurality of unevenness wings 22 may include a first unevenness wing 22a, a second unevenness wing 22b, a third unevenness wing 22c, and a fourth unevenness wing 22d, and the uppermost wing 24, the first unevenness wing 22a, the second unevenness wing 22b, the third unevenness wing 22c, and the fourth unevenness wing 22d may be operated together in accordance with an operation of the wing opening and closing device.

Sizes of the first unevenness wing 22a, the second unevenness wing 22b, the third unevenness wing 22c, and the fourth unevenness wing 22d may be different depending on positions where the first unevenness wing 22a, the second unevenness wing 22b, the third unevenness wing 22c, and the fourth unevenness wing 22d are installed, respectively. For example, the first unevenness wing 22a and the second unevenness wing 22b each have an upper edge which is one end portion directed in the direction in which air flows in and formed in a straight line shape, and the unevenness shape may be formed along the straight line shape of the upper edge. The third unevenness wing 22c has an upper edge that is one end portion directed in the direction in which air flows in, a center of the upper edge is formed in a circular arc shape, and the unevenness shape is formed along the circular arc shape of the upper edge. Further, the fourth unevenness wing 22d has an upper edge that is one end portion directed in the direction in which air flows in, a geometric central portion of the upper edge is concavely formed in a concave shape, and the unevenness shape may be formed along the concave shape of the upper edge.

In accordance with friction, which occurs between air blown from an air conditioning system and a wall surface of the duct 10, and in accordance with positions where blown air is concentrated, an amount of air transmitted to the unevenness wings 22 may vary, and therefore, the occurrence of a whistling noise may be different in accordance with the positions. Therefore, the sizes and the shapes of the unevenness wings 22 may be different in order to prevent the occurrence of a whistling noise in consideration of an amount of air transmitted to the unevenness wings 22.

Five wings are included in the front wings 20 according to the exemplary embodiment of the present invention, but more than or less than five wings may be provided.

A protrusion L, which protrudes in a direction toward the rear wings 30, may be provided on an upper portion of each of the front wings 20, which overlaps another front wing 20 when the front wings 20 are closed, and a groove C, into which the protrusion L is inserted, may be formed in one surface of each of the front wings 20, which comes into contact with the protrusion L when the front wings 20 are closed. The protrusion L may be provided at a position spaced apart from the unevenness shape of the unevenness wing 22 at a predetermined distance. The protrusions L are inserted into the grooves C, thereby minimizing an air leak that occurs at the front wings 20 when the front wings 20 having the overlapping structure are closed.

Circular wing shafts 26 are integrally formed on the uppermost wing 24 and the unevenness wings 22, respectively, and the wing shafts 26 are installed to the inner portion of the duct 10 and allow the respective wings to rotate.

One end portion of the unevenness wing 22, which is directed in the direction in which air flows in, may include semi-circular notches. Alternatively, one end portion of the unevenness wing 22 may include polygonal notches. One end portion of the unevenness wing 22 may include irregular-shaped notches that are different from the aforementioned shapes of the notches. The unevenness shape of the unevenness wing 22 is not limited to one shape, but may be a protruding shape or a concave shape as long as the unevenness shape may convert a laminar flow of air into a turbulent flow of air.

The duct 10 of the air vent 1 may be formed in a quadrangular shape or a circular shape in order to allow air blown from the air conditioning system for a vehicle to smoothly flow. The inner portion of the duct 10 may be formed to have a flat surface in order to minimize friction with supplied air.

The duct 10 may have the discharge port 12 to discharge air blown from the air conditioning system for a vehicle to the outside. The front wings 20 are installed inside the discharge port 12, and the rear wings 30 are installed outside the discharge port 12. The front wings 20 and the rear wings 30 are installed to the discharge port 12, thereby shutting off air discharged from the discharge port 12, or adjusting an air direction.

The duct 10 may include projections 14 which overlap the uppermost wing and a lowermost wing of the front wings 20 when the front wings 20 are closed. The projections 14 each have a structure that overlaps the front wings 20, thereby preventing the occurrence of an air leak.

For example, the duct 10 may include the projections 14 that overlap the uppermost wing 24 and the fourth unevenness wing 22d. In addition, grooves C, into which the protrusions L of the uppermost wing 24 and the fourth unevenness wing 22d are inserted, may be formed in surfaces of the projections 14. When the front wings 20 are closed, a gap between the duct 10 and the uppermost wing 24 and a gap between the duct 10 and the fourth unevenness wing 22d are sealed by the grooves C of the duct 10 and the protrusions L of the uppermost wing 24 and the fourth unevenness wing 22d, thereby minimizing the occurrence of an air leak.

The rear wings 30 are positioned downstream of the discharge port 12, and control air passing over the front wings 20. Further, the rear wings 30 have the plurality of wings 32 that is disposed to be perpendicular to the front wings 20, thereby adjusting an air direction and an amount of air in a direction that is different from the direction adjusted by the front wings 20.

The wings 32, which constitute the rear wings 30, may be formed in a plate shape that has both streamlined lateral portions and a predetermined thickness. As in the exemplary embodiment of the present invention, four wings 32 may be provided, or more than or less than four wings 32 may be provided.

For example, the rear wings 30 may have an overlapping structure in which the wings 32 overlap each other so as to shut off an air flow when the rear wings 30 are closed. In addition, predetermined gaps may be formed between the wings 32. The predetermined gap between the wings 32 may be 0.5 mm or less.

The wings 32 of the rear wings 30 are formed integrally with rear wing shafts 38 so as to be rotated. The rear wing shafts 38 are inserted into an upper surface and a lower surface of the inner portion of the duct 10.

The front wings 20 may be installed in a horizontal direction inside the duct 10, and the rear wings 30 may be installed in a vertical direction inside the duct 10. The wings 32 of the rear wings 30 are installed in a vertical direction, thereby adjusting a direction of air discharged from the discharge port 12 of the duct 10 to the left side and the right side. The unevenness wings 22 and the uppermost wing 24 of the front wings 20 are installed in a horizontal direction, thereby adjusting a direction of air discharged from the discharge port 12 of the duct 10 to the upper side and the lower side.

The wing opening and closing device may control the operations of opening and closing the front wings 20 and the rear wings 30.

For example, in the exemplary embodiment of the present invention, the wing opening and closing device may include a knob connecting portion 36 which is connected to the rear wings 30 and the front wings 20, and a knob 34 which is connected to the knob connecting portion 36 and installed to the rear wings 30.

The knob 34 and the knob connecting portion 36 are connected to each other, such that the knob connecting portion 36 may be moved in accordance with movement of the knob 34.

The knob 34 may be installed on the wing 32 that is positioned at a center of the rear wings 30, and the knob connecting portion 36 may be connected to the third unevenness wing 22c of the front wings 20. The knob 34 may be separately formed, and then installed by being fitted with the rear wings 30 and the front wings 20. The knob connecting portion 36, which is connected to the knob 34, may be connected to the wing that is positioned at a center of the front wings 20, and may close the front wings 20 and the rear wings 30 by manipulating the knob 34.

The knob 34 may be sized to be gripped with about two to three fingers, and may be formed in a plate shape so as to be easily gripped with the fingers.

The knob 34 provides a user of the air vent 1 with convenience which allows the user to be able to adjust an air direction and an amount of air in accordance with the user's preference. In addition, the knob 34 is connected to all of the front wings 20 and the rear wings 30, thereby conveniently adjusting an air direction and an amount of air only by using the knob 34.

Alternatively, the wing opening and closing device may include a handle connecting portion which is connected to the rear wings 30 and the front wings 20, and a handle which is connected to the handle connecting portion and installed outside the discharge port 12. For example, the handle may be a dial type handle that is independently installed outside the discharge port 12 and rotated, and the handle may control the operations of opening and closing the front wing 20 and the rear wing 30.

Alternatively, the wing opening and closing device may include a connecting portion which is connected to the rear wing 30 and the front wing 20 and has an electric motor, and a button which is installed on an instrument panel in a vehicle to control an operation of the electric motor. The electric motor is operated by manipulating the button, thereby controlling the operations of opening and closing the rear wings 30 and the front wings 20.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An air vent for a vehicle, comprising:
   a duct which has a discharge port;
   first vanes which are positioned upstream of the discharge port, the first vanes
   including a plurality of unevenness vanes, each of the unevenness vanes having a plurality of notches;
   second vanes which are positioned downstream of the discharge port, the second
   vanes being disposed such that rotational axes of the second vanes are perpendicular to rotational axes of the first vanes; and
   a wing opening and closing device which controls operations of opening and closing the first vanes and the second vanes,
   wherein a portion of one of the plurality of unevenness vanes is convex in a plane defined by a rotational axis of the one unevenness vane and an axis perpendicular to the rotational axis of the one unevenness vane, the convex portion including the plurality of notches of the one unevenness vane, the plurality of notches of the one unevenness vane being arranged along a convex curve in the plane.

2. The air vent of claim 1, wherein the first vanes have an overlapping structure such that predetermined portions of adjacent first vanes overlap with each other and a first predetermined gap exists between the overlapped portions of the adjacent first vanes when the first vanes are closed using the wing opening and closing device, and
   wherein the second vanes have an overlapping structure such that predetermined portions of adjacent second vanes overlap with each other and a second predetermined gap exists between the overlapped portions of the adjacent second vanes when the adjacent second vanes are closed using the wing opening and closing device.

3. The air vent of claim 1, wherein the first vanes further include an end vane which is positioned over the plurality of unevenness vanes and has a flat shape.

4. The air vent of claim 1, wherein each of the first vanes includes a protrusion protruding from a first surface of each of the first vanes,
   wherein each of the first vanes further includes a groove disposed on a second surface that is opposite to the first surface, and
   wherein a protrusion of a first one of the first vanes is inserted into a groove of a second one of the first vanes, the second one being adjacent to the first one when the first vanes are closed.

5. The air vent of claim 1, wherein each of the plurality of notches is a semi-circular notch.

6. The air vent of claim 1, wherein each of the plurality of notches is a polygonal notch.

7. The air vent of claim 1, wherein each of the plurality of notches is an irregular-shaped notch.

8. The air vent of claim 2, wherein the first and second predetermined gaps are equal to or less than 0.5 mm.

9. The air vent of claim 1, wherein the wing opening and closing device includes:
- a knob connecting portion which is connected to the first and second vanes; and
- a knob which is connected to the knob connecting portion and coupled to the second vanes.

10. The air vent of claim 1, wherein the first vanes further include first and second end vanes, wherein the duct includes projections that overlap with corresponding portions of the first and second end vanes when the first vanes are closed.

11. The air vent of claim 2, wherein the first and second predetermined gaps are less than 0.3 mm.

12. The air vent of claim 1, wherein the one unevenness vane is a first unevenness vane, the plurality of unevenness vanes further including a second unevenness vane, the second unevenness vane overlapping with the first unevenness vane when the first and second unevenness vanes are closed, and
- wherein the second unevenness vane has a protruding portion, the protruding portion including the plurality of notches of the second unevenness vane, the plurality of notches of the second unevenness vane being arranged along a straight line on a top surface of the second unevenness vane.

\* \* \* \* \*